(12) United States Patent
Yue et al.

(10) Patent No.: US 11,675,149 B2
(45) Date of Patent: Jun. 13, 2023

(54) DUAL-CARRIER INTEGRATED OPTICAL DEVICE AND PHOTOELECTRIC MODULE

(71) Applicant: Wuhan Telecommunication Devices Co., Ltd, Wuhan (CN)

(72) Inventors: Yangyang Yue, Wuhan (CN); Xiaoping Song, Wuhan (CN); Chengpeng Fu, Wuhan (CN); Jian Li, Wuhan (CN); Qinlian Bu, Wuhan (CN); Hongchun Xu, Wuhan (CN); Wuping Zhang, Wuhan (CN); Chenggang Liu, Wuhan (CN)

(73) Assignee: Wuhan Telecommunication Devices Co., Ltd

( * ) Notice: Subject to any disclaimer, the term of this patent is extended or adjusted under 35 U.S.C. 154(b) by 208 days.

(21) Appl. No.: 17/254,074

(22) PCT Filed: Dec. 25, 2018

(86) PCT No.: PCT/CN2018/123310
§ 371 (c)(1),
(2) Date: Dec. 18, 2020

(87) PCT Pub. No.: WO2020/042484
PCT Pub. Date: Mar. 5, 2020

(65) Prior Publication Data
US 2021/0263246 A1   Aug. 26, 2021

(30) Foreign Application Priority Data

Aug. 28, 2018   (CN) .......................... 201810989930.2

(51) Int. Cl.
*G02B 6/42* (2006.01)
(52) U.S. Cl.
CPC ......... *G02B 6/4269* (2013.01); *G02B 6/4215* (2013.01)

(58) Field of Classification Search
None
See application file for complete search history.

(56) References Cited

U.S. PATENT DOCUMENTS

| | | |
|---|---|---|
| 2002/0090017 A1 | 7/2002 | Hagberg et al. |
| 2004/0190571 A1 | 9/2004 | Sutton et al. |
| | (Continued) | |

FOREIGN PATENT DOCUMENTS

| | | |
|---|---|---|
| CN | 1507683 A | 6/2004 |
| CN | 1977431 A | 6/2007 |
| | (Continued) | |

OTHER PUBLICATIONS

Chinese Search Report for Application No. 201810989930.2 dated May 6, 2019, 2 pages.

(Continued)

*Primary Examiner* — Chad H Smith
(74) *Attorney, Agent, or Firm* — Lerner David LLP

(57) ABSTRACT

Disclosed are a dual-carrier integrated optical device and a photoelectric module. The optical device comprises: an encapsulation unit, and a ceramic substrate and two independent carrier assemblies arranged in the encapsulation unit. Every carrier assembly comprises a DWDM active chip arranged on the first heat sink, a first heat sink arranged on the independent control element, and an independent control element for adjusting the temperature of the DWDM active chip to adjust an output wavelength of the DWDM active chip. The DWDM active chip and the independent control element are respectively connected to the ceramic substrate. According to the characteristic that the wavelength of the active chip will shift with the temperature, an output laser wavelength of each active chip is independently controlled by means of the independent control element, which (Continued)

achieves higher wavelength stability and can realize optical signal transmission at different rates.

19 Claims, 4 Drawing Sheets

(56) References Cited

U.S. PATENT DOCUMENTS

| | | | |
|---|---|---|---|
| 2008/0298402 A1 | 12/2008 | Rossi et al. | |
| 2015/0125162 A1* | 5/2015 | Pfnuer | G02B 6/4271 398/201 |
| 2016/0127038 A1* | 5/2016 | Liao | H01S 5/02438 398/38 |
| 2017/0222718 A1* | 8/2017 | Xue | H04J 14/0221 |
| 2017/0272169 A1* | 9/2017 | Ho | G02B 6/4245 |
| 2019/0190615 A1 | 6/2019 | Xue et al. | |

FOREIGN PATENT DOCUMENTS

| | | | |
|---|---|---|---|
| CN | 202600259 U | 12/2012 | |
| CN | 203660274 U | 6/2014 | |
| CN | 104466669 A | 3/2015 | |
| CN | 105511029 A | 4/2016 | |
| CN | 106125212 A | 11/2016 | |
| CN | 106253994 A | 12/2016 | |
| CN | 107024744 A | 8/2017 | |
| CN | 108008500 A | 5/2018 | |
| CN | 207636817 U | 7/2018 | |
| GB | 2392552 A * | 3/2004 | ............... G02B 6/12 |
| WO | WO-2006002663 A1 * | 1/2006 | ........... G02B 27/149 |

OTHER PUBLICATIONS

International Search Report for Application No. PCT/CN2018/123310 dated Apr. 28, 2019, 2 pages.
Supplementary Chinese Search Report for Application No. 201810989930.2 dated Sep. 9, 2019, 2 pages.

* cited by examiner

DUAL-CARRIER INTEGRATED OPTICAL DEVICE AND PHOTOELECTRIC MODULE

CROSS-REFERENCE TO RELATED APPLICATIONS

The present application is a national phase entry under 35 U.S.C § 371 of International Application No. PCT/CN2018/123310 filed Dec. 25, 2018, which claims priority from Chinese Application No. 201810989930.2 filed Aug. 28, 2018, all of which are hereby incorporated herein by reference.

TECHNICAL FIELD OF THE DISCLOSURE

Embodiments of the present disclosure relate to the field of optical communications and photoelectric devices, and in particular relate to a dual-carrier integrated optical device and an photoelectric module.

BACKGROUND

In recent years, stimulated by the demand of dramatically growth of global Internet flow data traffic and the huge bandwidth demand for new services such as cloud computing, video application, social network and the like, the communication capacity is increased in explosion.

In the current technology, the modulation rate of a single dense wavelength division multiplexing (DWDM) active chip is not enough to support the bandwidth demand, which leads to various multiplexing technologies. The DWDM system, as the first choice for network optimization, can effectively solve the problem of insufficient modulation rate of the single DWDM active chip. Multiple DWDM active chips having different wavelengths are coupled with wavelength division multiplexing elements thereof having the same central wavelength and modulated the output light through different channels, so that the purpose of improving the communication bandwidth is realized.

However, the central wavelength of single DWDM active chip is originally irregular without any influence of temperature and current; and in practical application, due to the influence of current and voltage, the phenomena of wavelength offset and the like are easier to occur. Therefore, how to provide the wavelength stability of laser to meet the requirement of the DWDM system is a problem to be solved urgently.

SUMMARY

In order to solve the problems existing in the prior art, embodiments of the present disclosure provide a dual-carrier integrated optical device and an photoelectric module.

In a first aspect, the embodiments of the present disclosure provide a dual-carrier integrated optical device, comprising: an encapsulation unit, and a ceramic substrate and two sets of independent carrier assemblies both arranged in the encapsulation unit;

every set of carrier assembly respectively comprises a DWDM active chip, a first heat sink, and an independent control element;

the DWDM active chip is arranged on the first heat sink, and the first heat sink is arranged on the independent control element;

the DWDM active chip and the independent control element is respectively connected to the ceramic substrate; the independent control element is used to adjust temperature of the DWDM active chip to adjust an output wavelength of the DWDM active chip.

Further, said every set of carrier assembly further comprises a wavelength locker connected with the ceramic substrate;

a portion of laser output by the DWDM active chip is output to an optical fiber, and the remaining portion enters the wavelength locker; the wavelength locker divides received laser signals into two paths of optical signals, and obtains a direction and a size of wavelength drift of the DWDM active chip through a ratio of the two paths of optical signals, and feeds back the direction and the size of the wavelength drift to the independent control element; the independent control element adjusts the temperature of the DWDM active chip according to the direction and the size of the wavelength drift, so that a wavelength of the laser output by the DWDM active chip approaches a preset wavelength to realize a wavelength adjustment.

Further, said every set of carrier assembly further comprises a temperature sensing element;

the temperature sensing element is connected with the ceramic substrate and is used to set working temperature of the DWDM active chip.

Further, the first heat sink is also provided with a collimating lens which is used to collimate laser output by the DWDM active chip.

Further, the encapsulation unit is provided with two optical windows, every one of which is respectively corresponding to a set of carrier assembly to transmit laser output by the carrier assembly;

a sleeve is respectively arranged at each optical window, and a contact pin is connected with the sleeve and is used for outputting the laser to an optical fiber.

Further, the encapsulation unit is further provided with a second heat sink and a combining element arranged on the second heat sink;

the combining element is used for outputting laser which is output by the two sets of independent carrier assemblies and then combined.

Further, one optical window is arranged on the encapsulation unit for transmitting the laser after being combined by the combining element;

a sleeve is arranged at the one optical window and is connected with a contact pin which is used to output the laser to an optical fiber.

In a second aspect, an embodiment of the present invention provides a photoelectric module comprising the dual-carrier integrated optical device described in the first aspect of the embodiment of the present disclosure and any optional embodiment thereof.

According to the characteristic that the wavelength of the active chip is offset along with the temperature, the dual-carrier integrated optical device and the photoelectric module provided by the embodiments of the present disclosure respectively independently control the temperature of each active chip through the independent control element to adjust the wavelength of the chip, and further improve the wavelength stability of the laser through a wavelength locker; and in specific applications, they realize different rates of transmission by improving the internal structure and the external structure of the dual-carrier integrated optical device and by the modulation mode of signal.

BRIEF DESCRIPTION OF THE DRAWINGS

For a more clear description of the embodiments of the present disclosure or the technical solutions in the prior arts, the drawings to be used in the description of the embodiments or the prior arts will be briefly introduced below, and obviously, the drawings are only for some embodiments of the present disclosure, and those with ordinary skills in the art may obtain other drawings based on these drawings without paying creative labor.

| | |
|---|---|
| 1: encapsulation unit | 2: ceramic substrate |
| 3: upper cover of an encapsulation unit | 4: DWDM active chip |
| 5: wavelength locker | 6: temperature sensing element |
| 7: first heat sink | 8: independent control element |
| 9: collimating lens | 10: glass cushion block |
| 11: optical window | 12: sleeve |
| 13: contact pin | 14: combining element |
| 15: second heat sink | 16: connecting wire |

DETAILED DESCRIPTION OF THE PREFERRED EMBODIMENTS

In order to make the objectives, technical solutions and advantages of the embodiments of the present disclosure more obvious, the technical solutions in the embodiments of the present disclosure will be clearly described below in conjunction with the accompanying drawings in the embodiments of the present disclosure. Obviously, the described embodiments are only a portion of embodiments of the present disclosure, but not all embodiments. Based on the embodiments of the present disclosure, all other embodiments obtained by those of ordinary skill in the art without inventive labor shall fall within the protection scope of the present disclosure.

At present, due to the limitation of chip process, the central wavelength of single DWDM active chip is originally irregular without any influence of temperature and current, and if the influence of temperature and current is considered, the situation of the central wavelength is more complex. At present, the commonly used method of stabilizing the wavelength is only suitable for CWDM systems with larger wavelength intervals, wherein the working temperature of the DWDM active chip is controlled by adding an independent control element and the control precision of the temperature thereof is ±0.1° C. However, in a DWDM system with a wavelength interval of 0.8 nm or even 0.4 nm, it is difficult to ensure to satisfy the requirement that the drift amount of wavelength is tens of pm under high and low temperature conditions. This requires a necessary additional wavelength stabilization technology to further improve the wavelength stability of the DWDM active chip.

In addition, in a DWDM system, long-distance transmission can be realized in a 1550 nm band due to the occurrence of the dispersion compensator. Therefore, in the high-speed era of 40G and above 40G, compared with a single-channel device, an integrated optical device is more needed to increase the transmission capacity and to save optical fiber resources. In view of the above mentioned problem, the embodiments of the disclosure provides a dual-carrier integrated optical device.

Figure 1:
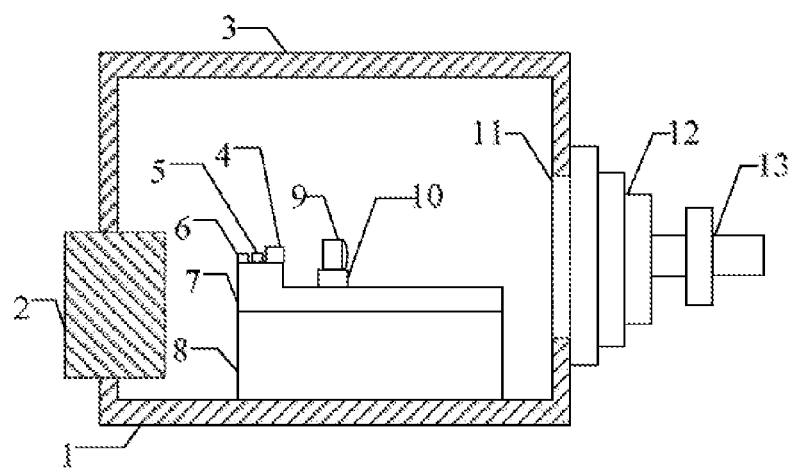
FIG. 1 is a front view of a dual-carrier integrated optical device with a dual contact pin structure according to an embodiment of the present disclosure.

FIG. 1 is a front view of a dual-carrier integrated optical device with a dual contact pin structure according to an embodiment of the present disclosure. The dual-carrier integrated optical device as shown in FIG. 1 comprises a encapsulation unit 1, and a ceramic substrate 2 and two sets of independent carrier assemblies both provided in the encapsulation unit 1;

every set of the carrier assemblies comprises a DWDM active chip 4, a first heat sink 7, and an independent control element 8;

the DWDM active chip 4 is arranged on the first heat sink 7, and the first heat sink 7 is arranged on the independent control element 8;

the DWDM active chip 4 and the independent control element 8 are respectively connected with the ceramic substrate 2;

the independent control element 8 is used to adjust the temperature of the DWDM active chip 4 to adjust an output wavelength of the DWDM active chip 4.

Figure 2:
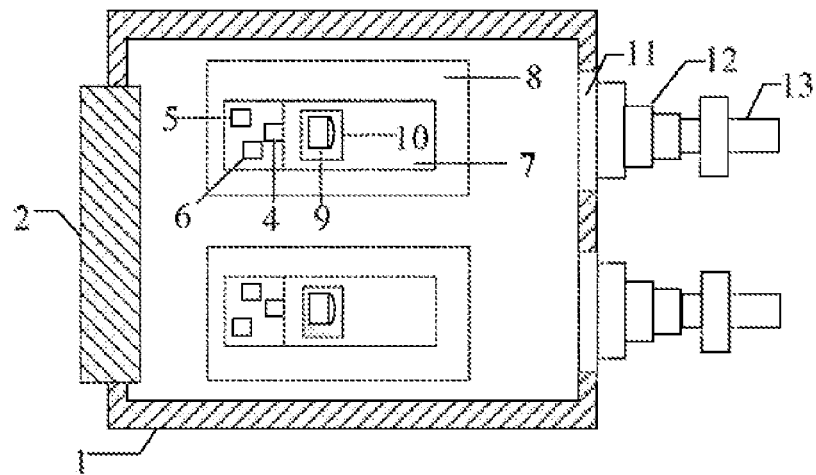
FIG. 2 is a top view of a dual-carrier integrated optical device with a dual contact pin structure according to an embodiment of the present disclosure.

FIG. 2 is a top view of a dual-carrier integrated optical device with a dual contact pin structure according to an embodiment of the present disclosure. Referring to FIG. 2, the dual-carrier integrated optical device according to the embodiment of the present disclosure comprises two sets of independent carrier assemblies, and every set of carrier assembly can generate one carrier, so it is a dual-carrier integrated optical device. Specifically, every set of carrier assembly includes two core components, namely a DWDM active chip 4 and an independent control element 8, wherein the independent control element 8, the first heat sink 7 and the DWDM active chip 4 are sequentially fixed from bottom to top, and wherein the first heat sink 7 may be a tungsten copper heat sink. The range of emission wavelengths of the DWDM active chip 4 in each carrier assembly can be identical or different.

In the dual-carrier integrated optical device shown in the embodiment of FIG. 1 and FIG. 2 of the present disclosure, in addition to the above core components, each carrier assembly further comprises a wavelength locker 5, a temperature sensing element 6, a collimating lens 9 and a glass cushion block 10. It further comprises an encapsulation-unit upper cover 3, and an output assembly corresponding to each carrier assembly, wherein each output assembly comprises an optical window 11, a sleeve 12, and a contact pin 13 all arranged on the encapsulation unit 1, and the laser output by the DWDM active chip 4 is transmitted to an optical fiber through the contact pin 13. It can be seen that in the dual-carrier integrated optical device of the embodiment of the present disclosure, the internal elements and structural connection relationships of each carrier component are completely identical, and the structures of the corresponding output assemblies are also completely identical. Since the number of contact pins 13 is the same as the number of DWDM active chips 4, and the numbers of the both are two, and therefore, the embodiments of FIG. 1 and FIG. 2 are dual-carrier integrated optical devices with a dual contact pin structure.

The encapsulation unit 1 is used for lifting or accommodating two sets of independent carrier assemblies, and has a certain signal transmission effect. The encapsulation unit 1 can be an air-tight encapsulation unit or a non-air-tight encapsulation unit, and can also be encapsulation unit with or without housing. And the encapsulation unit 1 can be integrated with any other functional units. For example, the encapsulation unit 1 may be a cartridge, and the encapsulation-unit upper cover 3 may be a cap used in cooperation with the cartridge.

The positional relationship of each device inside the encapsulation unit 1 of the embodiment of the present disclosure is as follows: the DWDM active chip 4, the collimating lens 9 and the glass cushion block 10 are all fixedly arranged on the stair-shaped first heat sink 7, and then are integrally and fixedly arranged on the independent control element 8 through the first heat sink 7; wherein the wavelength locker 5, the temperature sensing element 6 and other small elements can be placed adjustably according to the actual space, and also can be placed on the first heat sink 7.

Figure 3:
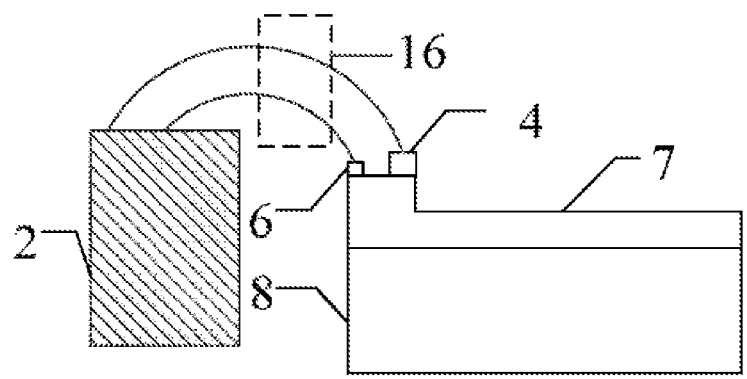
FIG. 3 is a front view of the electrical connection relationship of a dual-carrier integrated optical device according to an embodiment of the present disclosure.
Figure 4:
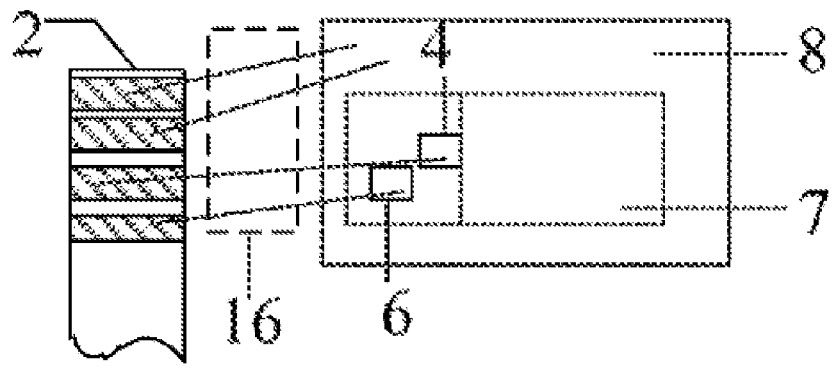
FIG. 4 is a top view of the electrical connection relationship of a dual-carrier integrated optical device according to an embodiment of the present disclosure.

FIG. 3 is a front view of the electrical connection relationships of the dual-carrier integrated optical device according to an embodiment of the present disclosure, and FIG. 4 is a top view of the electrical connection relationships of the dual-carrier integrated optical device according to an embodiment of the present disclosure. Referring to FIG. 3 and FIG. 4, in terms of an electrical connection relationship, the DWDM active chip 4, the temperature sensing element 6, and the independent control element 8 are respectively connected with the ceramic substrate 2 through connecting wires 16. The connecting wire 16 can be a metal wire, and the DWDM active chip 4, the temperature sensing element 6, and the independent control element 8 are respectively connected with corresponding pins of the ceramic substrate 2 through the metal wire.

According to the characteristic that the wavelength of the active chip is shift along with temperature, the dual-carrier integrated optical device provided by the embodiment of the present disclosure independently controls the temperature of each active chip respectively through the independent control element to adjust the wavelength of the chip; in specific applications, the different rates of transmission can be realized by improving the internal structure and the external structure of the dual-carrier integrated optical device and by the modulation mode of signal.

Based on each of the embodiments as mentioned above, said every set of carrier assembly further comprises a wavelength locker 5 connected with the ceramic substrate, and the wavelength locker 5 can select a suitable position according to the actual space of the encapsulation unit 1 as long as the optical path of the DWDM active chip 4 is not blocked.

The working principle of each carrier assembly of the dual-carrier integrated optical device of the present embodiment is as follows:

a portion of the laser output by the DWDM active chip 4 is output to an optical fiber, and the remaining portion enters the wavelength locker 5; the wavelength locker 5 divides the received laser signals into two paths of optical signals, obtains a direction and a size of wavelength drift of the DWDM active chip 4 through a ratio of the two paths of the optical signals, and feeds back the direction and the size of the wavelength drift to the independent control element 8; then the independent control element 8 adjusts temperature of the DWDM active chip 4 according to the direction and the size of the wavelength drift, so that the wavelength of the laser output by the DWDM active chip 4 approaches a preset wavelength, thereby realizing a wavelength adjustment.

Figure 5:
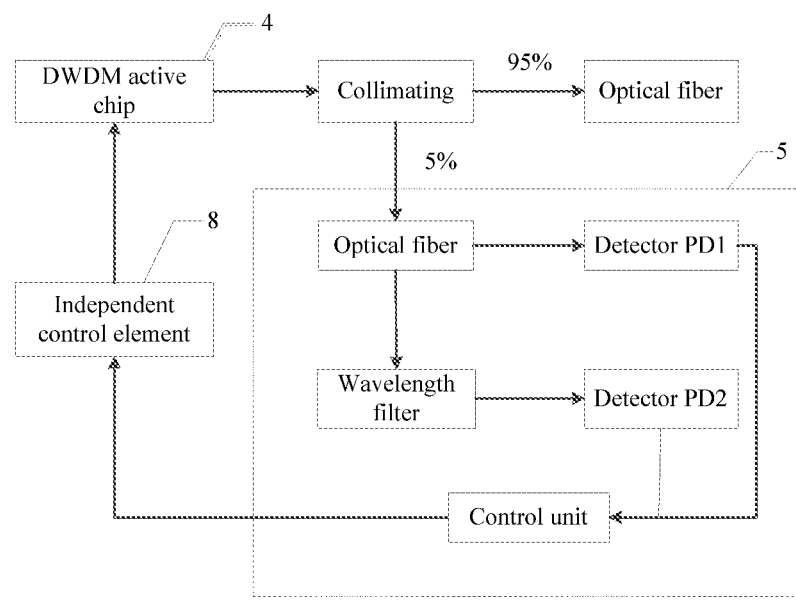
FIG. 5 is a schematic diagram of internal signal transmission relationships of a dual-carrier integrated optical device according to an embodiment of the present disclosure.

FIG. 5 is a schematic diagram of internal signal transmission relationships of the dual-carrier integrated optical device according to an embodiment of the present disclosure. Referring to FIG. 5, the laser output by the DWDM active chip 4 is collimated through a main optical path, then output to the optical fiber by 95% of the light and enters the wavelength locker 5 by the remaining 5%, wherein the wavelength locker 5 is composed of a wavelength filter, a detector PD1, a detector PD2 and a control unit; the wavelength locker 5 divides such portion of light into two paths, one of which directly enters the detector PD1 as reference light; the other of which enters directly the wavelength filter and then the detector PD2 as signal light; both the reference light and the signal light enter the control unit of the wavelength locker 5, and the direction and the size of the wavelength drift of the DWDM active chip 4 are determined by the ratio of the two paths of light in the control unit, and then fed back to the independent control element 8, then the independent control element 8 adjusts the temperature of the DWDM active chip 4 according to the direction and the size of the wavelength drift, so as to make the emission wavelength of the DWDM active chip 4 reply to a preset wavelength. In addition, the light directly entering the detector PD1 can be used as a backlight monitoring current to monitor the working status of the DWDM active chip 4 in real time.

The dual-carrier integrated optical device provided by the embodiments of the present disclosure further improves the wavelength stability of laser through the wavelength locker.

Based on the foregoing embodiments, every set of carrier assembly further comprises a temperature sensing element 6;

the temperature sensing element 6 is connected with the ceramic substrate 2 and is used for setting the working temperature of the DWDM active chip 4.

In the embodiment of the present disclosure, every set of carrier assembly comprises a temperature sensing element 6. Therefore when the temperature is adjusted, due to the independence of each temperature sensing element 6, the corresponding DWDM active chip 4 can be set at different working temperature; and then by adjusting the current or voltage loaded on the independent control element 8, the wavelength of the DWDM active chip 4 can be indirectly adjusted. Specifically, the temperature sensing element 6 may be a thermistor or other type of temperature sensor.

By providing the independent temperature sensing element and the independent control element for each carrier assembly, the embodiments of the present disclosure realizes independent adjustment of the working temperature of each carrier assembly, and independent adjustment of the direction and the size of the wavelength drift of each carrier assembly, and then realizes precise wavelength adjustment, such that the stability of the output wavelength is higher.

Based on each of the embodiments as mentioned above, the output wavelengths of the two sets of independent carrier assemblies are a combination of any two wavelengths in a 96-channel combiner or a 48-channel combiner.

The output wavelength of the DWDM active chip in the two sets of independent carrier assemblies according to the embodiments of the present disclosure can be any combination of two wavelengths in the 96-channel combiner ($\lambda_1$, $\lambda_2$, $\lambda_3$, ..., $\lambda_{95}$, $\lambda_{96}$), or a combination of any two wavelengths in the 48-channel combiner ($\lambda_{01}$, $\lambda_{02}$, $\lambda_{03}$, ..., $\lambda_{047}$, $\lambda_{048}$), which may be adjacent wavelengths or non-adjacent wavelengths. For example, corresponding to the 96-channel combiner, the output wavelengths are $\lambda_n$ and $\lambda_k$, where n=1, 2, 3 ... 95, 96, and k=any number from 1 to 96 other than n; or corresponding to the 48-channel combiner, the output wavelengths are $\lambda_n$ and $\lambda_k$, where n=01, 02 ... 047, 048, and k=any number from 01 to 48 other than n.

Based on each of the embodiments as mentioned above, the first heat sink 7 is also arranged with a collimating lens 9, and the collimating lens 9 is used to collimate the laser output by the DWDM active chip 4.

Referring to FIG. 1, the collimating lens 9 is arranged on the glass cushion block 10, and the glass cushion block 10 is arranged on the first heat sink 7. The collimating lens 9 may be a ball lens or an aspheric lens, and its material may be a silicon-based material, glass or other material. In the embodiments of the present disclosure, the optical path is collimated by the collimating lens 9, and the light beam of the light emitted by the DWDM active chip 4 after passing through the lens 9 has a better quality.

Based on each of the embodiments as mentioned above, two optical windows 11 are arranged on the encapsulation unit 1, and each optical windows 11 is corresponding to every set of carrier assembly, and is used for transmitting the laser output by the carrier assemblies; a sleeve 12 is respectively arranged at each optical window 11, and a contact pin 13 is connected with the sleeve 12 and is used for outputting the laser to an optical fiber.

Referring to FIG. 1 and FIG. 2, the dual-carrier integrated optical device with the dual contact pin structure according to the embodiment of the present disclosure comprises two output assemblies, which are respectively corresponding to two sets of independent carrier assemblies and are used for outputting the laser output by the carrier assembly. Specifically, each output assembly comprises an optical window 11 arranged on the encapsulation unit 1, a sleeve 12 arranged at the optical window 11, and a contact pin 13 connected with the sleeve 12.

The dual-carrier integrated optical device in the embodiments of the present disclosure uses a dual contact pin structure mode, and the light wave emitted by each DWDM active chip 4, after being shaped by the collimating lens 9, passes through the optical window 11, the sleeve 12 and the contact pin 13 in sequence and then directly enters the optical fiber without passing through turning points in the optical path. In the present structure, the numbers of DWDM active chips 4 and pins 13 are the same.

Figure 6:
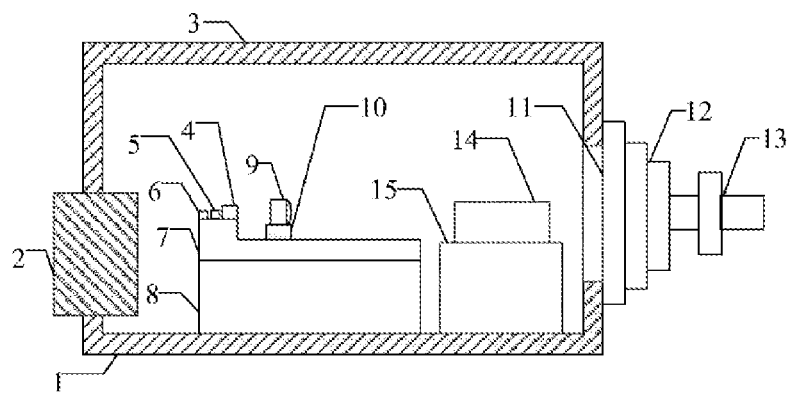
FIG. 6 is a front view of a dual-carrier integrated optical device with a single contact pin structure according to an embodiment of the present disclosure.

FIG. 6 is a front view of the double carrier integrated optical device with a single contact pin structure according to an embodiment of the present disclosure. based on each of the embodiments as mentioned above, the encapsulation unit 1 is further arranged with a second heat sink 15 and a combining element 14 arranged on the second heat sink 15, wherein the combining element 14 and the second heat sink 15 are fixed in position. The combining element 14 is used for combining and outputting the laser output by the two sets of independent carrier assemblies. Specifically, the second heat sink may be a Kovar heat sink.

The double carrier integrated optical device with the single contact pin structure according to the embodiment of the present disclosure comprises two sets of independent carrier assemblies, wherein the internal structure and the connection relationships of each carrier assembly are the same as the internal structure and the connection relationships of each carrier assembly in the dual-carrier integrated optical device with the dual contact pin structure. In the present embodiment, by adding the second heat sink 15 and the combining element 14 in the encapsulation unit 1, the laser output by the two sets of independent carrier assemblies is combined into one beam and then output.

Figure 8:
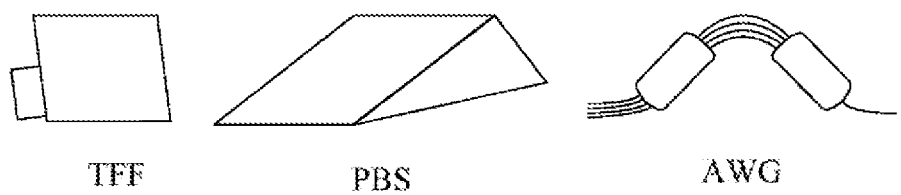
FIG. 8 is a schematic diagram of a combining element in a dual-carrier integrated optical device with a single contact pin structure according to an embodiment of the present disclosure.

FIG. 8 is a schematic diagram of a combining element in a dual-carrier integrated optical device with a single contact pin structure according to an embodiment of the present disclosure. Referring to FIG. 8, the embodiment of the present disclosure can be applied to a common combining element, such as a TFF block, a PBS or an AWG, and the like; and at the present stage, the TFF block is mostly used, and the PBS or the AWG can also be used for replacement. The TFF block realizes light beam combining or light beam splitting through the process of plating reflecting film and antireflection coating, and the PBS realizes light beam combining or light beam splitting through polarization, which has a specific limitation on wavelength. The channel consistency of the AWG is good, which can improve the pin coupling yield.

Figure 7:
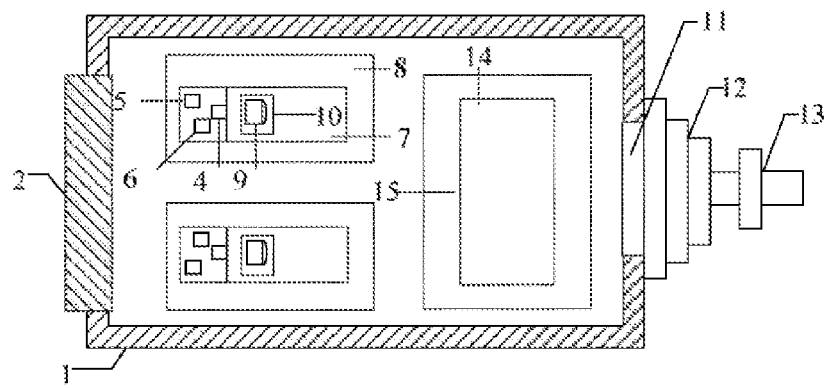
FIG. 7 is a top view of a dual-carrier integrated optical device with a single contact pin structure according to an embodiment of the present disclosure.

FIG. 7 is a top view of a dual-carrier integrated optical device with a single contact pin structure according to an embodiment of the present disclosure. Based on each of the embodiments as mentioned above, an optical window is arranged on the encapsulation unit for transmitting the laser after being combined by the combining element;

a sleeve is arranged at said one optical window, and a contact pin is connected with the sleeve and is used for outputting the laser to an optical fiber.

Referring to FIG. 6 and FIG. 7, the double carrier integrated optical device with a single pin structure according to the embodiment of the present disclosure comprises one output assembly for outputting the laser which has been output by the two sets of independent carrier assemblies and then combined. Specifically, the output assembly comprises an optical window 11 arranged on the encapsulation unit 1, a sleeve 12 arranged at the optical window 11, and a contact pin 13 connected with the sleeve 12, the specific structure of which are the same as each output assembly with the dual contact pin structure.

The dual-carrier integrated optical device according to the embodiment of the present disclosure uses a dual contact pin structure mode, and the light wave emitted by each DWDM active chip 4, after being shaped by the collimating lens 9, passes through the optical window 11, the sleeve 12 and the contact pin 13 in sequence and then directly enters the optical fiber without passing through the turning points in the optical path. In the present structure, there is only one contact pin 13. The design difficulty coefficient of the device is low, and the structure is simple and the practicability is good.

The advantages of the dual-carrier integrated optical device provided by the embodiments of the present disclosure are as follows: by independently controlling each carrier assembly, the following problem can be avoided, i.e. when the combining element having irregular passband range is associated with the DWDM active chip being different from each wavelength range, the passband of the combining element cannot well cover the wavelength range of the DWDM active chip, which can not only improve the output power of the device, but also improve the quality of optical eye diagram of the device, and can reduce the size of the encapsulation unit, save the internal space of the device, and reduce the power consumption of the device.

In summary, the dual-carrier integrated optical device provided by the embodiment of the present disclosure has the following core functional portions: 1) a DWDM active chip, which is used for emitting light with identical or different wavelengths; 2) an independent control element, which is used for setting the temperature of the DWDM active chip; 3) a wavelength locker, which is composed of a detector PD, a filter, and a laser control unit, and is used for accurately controlling the output wavelengths of the DWDM active chip. In addition to the core units, the expansion units that can be included are as follows: 1) a temperature sensing unit, which combines with an independent control element to adjust the center wavelength of the chip; 2) a lens assembly, which is used for collimating or diffusing or converging the light emitted by the DWDM active chip; 3) an encapsulation unit, which is used for lifting or accommodating a DWDM active chip unit, a combining unit, a temperature control unit and other non-core units, and which has a certain signal transmission effect; 4) a wavelength division multiplexing element for realizing the multiplexing for the active chips, which is corresponding to the DWDM active chip of different wavelengths and is composed of one or a group of wavelength division multiplexing elements, and which may be TFF, AWG, PBS or other types of the wavelength division multiplexing components, and this structure needs to be adjusted according to the encapsulation unit.

The dual-carrier integrated optical device provided by the embodiments of the present disclosure has the following advantages:

1. by controlling the temperature sensing element and the independent control element, the working temperature of each DWDM active chip can be precisely controlled, and then controlling of the output wavelength of the DWDM active chip can be realized;

2. when the output wavelength of the DWDM active chip is controlled by controlling the working temperature, meanwhile, the output wavelength of the DWDM active chip is further controlled by using cooperatively the wavelength locker, in order to improve the stability of the wavelength;

3. the output wavelength can be any combination of two wavelengths in the 96-channel combiner or the 48-channel combiner of the DWDM system.

4. by setting an external modulation mode, the laser is output in a plurality of different transmission rates.

5. the technical solution with the core functional units or the technical solution of adding different extended functions on the basis of the core functional units can be selectively used, so that the flexibility is high. In terms of a device's shell design, if a design method of the dual-carrier integrated optical device having the dual contact pin structure is used, the following problem can be avoided, i.e. when the combining element having an irregular passband range is associated with the DWDM active chip being different from each wavelength range, the passband of the combining element cannot well cover the wavelength range of the DWDM active chip. The dual-carrier-based integrated optical device having the dual contact pin structure can not only improve the output power of the device, but also improve the quality of the optical eye diagram of the device, and the spatial volume of the device can also be reduced. If the design method of the dual-carrier integrated optical device having the single contact pin structure is used, the structural design of the device is simple, and the practicability is more excellent.

According to the characteristic that the wavelength of the active chip is shift along with the temperature, the dual-carrier integrated optical device provided by the embodiments of the present disclosure independently controls the temperature of each active chip respectively through the independent control element to adjust the wavelength of the chip, and further improve the wavelength stability of the laser through the wavelength locker. In specific applications, the transmission of different rates can be realized by improving the internal structure and the external structure of the dual-carrier integrated optical device and by modulation mode of the signal. More importantly, the selected chip wavelength can be any two combinations of wavelengths that meet the DWDM system protocol, which has good beneficial effects.

The embodiments of the present disclosure also provides a photoelectric module, which comprises the dual-carrier integrated optical device described in any of the embodiments as mentioned above.

It should be noted that all of the photoelectric modules that include the dual-carrier integrated optical device described in any of the above embodiments of the present disclosure are within the protection scope of the embodiments of the present disclosure.

Figure 9:
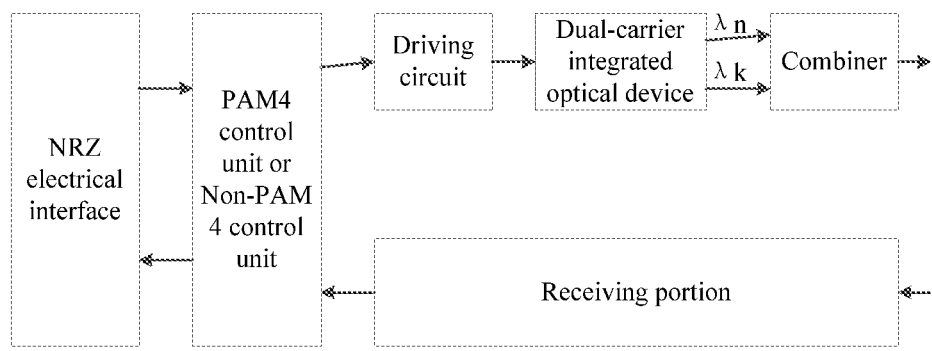
FIG. 9 is a schematic structural diagram of an photoelectric module based on a dual-carrier integrated optical device with a dual contact pin structure according to an embodiment of the present disclosure.

FIG. 9 is a schematic structural diagram of an photoelectric module based on a dual-carrier integrated optical device with a dual contact pin structure according to an embodiment of the present disclosure. The photoelectric module of the present embodiment is based on the dual-carrier integrated optical device with a dual contact pin structure, and the photoelectric module further comprises a multiplexer. The laser having two wavelengths output by the dual-carrier integrated optical device is combined by any two wavelength channels in the combiner and then output to the optical fiber.

Referring to FIG. 9, the photoelectric module containing a dual-carrier integrated optical device based on a dual contact pin structure comprises an NRZ electrical interface, a PAM4 modulation unit or a non-PAM4 modulation unit, a driving circuit, a dual-carrier integrated optical device, a combiner, and a receiving portion and the like. In the photoelectric module shown in FIG. 9, the dual-carrier integrated optical device is mainly used as an emission light source. By powering up the driving circuit and setting the working temperature of the independent control element, two light waves of different wavelengths are output by the DWDM active chip, and are combined into one light wave by the combiner and then is input into an optical fiber.

Figure 10:
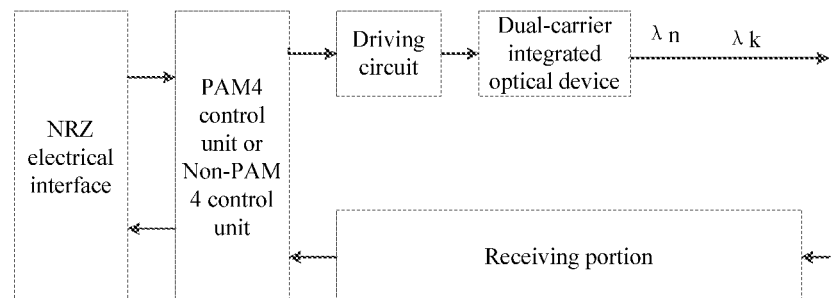
FIG. 10 is a schematic structural diagram of an photoelectric module based on a dual-carrier integrated optical device with a single contact pin structure according to an embodiment of the present disclosure.

FIG. 10 is a schematic structural diagram of a photoelectric module based on a dual-carrier integrated optical device with a single contact pin structure according to an embodiment of the present disclosure. The photoelectric module of the present embodiment is based on a dual-carrier integrated optical device with a single contact pin structure. The light waves of two different wavelengths have been combined in the device, so that there is no need to add an additional channel combiner inside the module, therefore the photoelectric module no longer contains a channel combiner.

Referring to FIG. 10, the photoelectric module based on a dual-carrier integrated optical device with a single contact pin structure comprises an NRZ electrical interface, a PAM4 modulation unit or a non-PAM4 modulation unit, a driving circuit, a dual-carrier integrated optical device, and a receiving portion and the like. In the photoelectric module shown in FIG. 10, the dual-carrier integrated optical device is mainly used as an emission light source. By powering up the driving circuit and setting the working temperature of the independent control element, two light waves of different wavelengths are output by the DWDM active chip, and are combined into one light wave by the combining unit in the device and then is output into the optical fiber.

Figure 11:
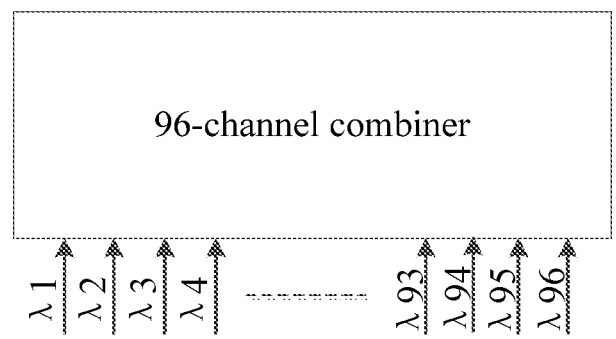
FIG. 11 is a schematic diagram of a 96-channel combiner according to an embodiment of the present disclosure.
Figure 12:
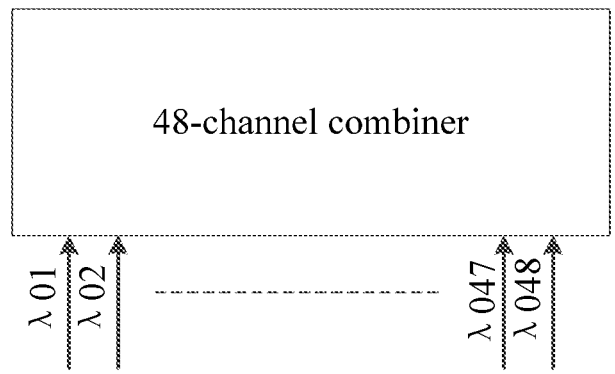
FIG. 12 is a schematic diagram of a 48-channel combiner according to an embodiment of the present disclosure.

FIG. 11 is a schematic diagram of a 96-channel combiner according to an embodiment of the present disclosure, and FIG. 12 is a schematic diagram of a 48-channel combiner according to an embodiment of the present disclosure. Specifically, the combiner may be a 96-channel combiner with a wavelength interval of 50 GHz (the channel wavelength is fixed), or a 48-channel multiplexer with a wavelength interval of 100 GHz (the channel wavelength is fixed). As mentioned above, The output wavelength of the DWDM active chip can be a combination of any two wavelengths in the 96-channel combiner, or a combination of any two wavelengths in the 48-channel multiplexer, which may be adjacent wavelengths or non-adjacent wavelengths, that is to say, it may be the combination of $\lambda_1$ and $\lambda_2$, the combination of $\lambda_1$ and $\lambda_{96}$, or the combination of $\lambda_2$ and $\lambda_{96}$ as shown in FIG. 11, generally speaking, the output wavelengths are $\lambda_n$ and $\lambda_k$, where n=1, 2, 3 . . . 95, 96, and k=any number from 1 to 96 other than n, and it may also be the combination of $\lambda_{01}$ and $\lambda_{02}$, the combination of $\lambda_{01}$ and $\lambda_{048}$, or the combination of $\lambda_{02}$ and $\lambda_{048}$ as shown in FIG. 12, generally speaking, the output wavelengths are $\lambda_n$ and $\lambda_k$, where n=01, 02 . . . 047, 048, and k=any number from 01 to 048 other than n.

In addition, when the photoelectric module shown in FIG. 9 and FIG. 10 is applied, different modulation modes can realize transmission at different rates. If non-PAM4 modulation is used, i.e. a general modulation mode, the simple superposition of the transmission rate can be realized; if PAM4 modulation is used, the transmission rate will be increased by one more time on the basis of the general modulation mode. For example, the transmission rate of a single DWDM active chip is 25G/s or 50G/s, then when the conventional modulation is used, the transmission rate of the device after being combined is 50G/s or 100G/s, and if the PAM4 modulation mode is adopted, the transmission rate of the device after combining is 100G/s or 200G/s. By means of the present mode, the communication capacity is increased on the basis that the channel is unchanged.

The dual-carrier integrated optical device according to the embodiments of the present disclosure can be applied to a 100G device. However, it should be noted that the solution in the embodiments of the present disclosure are not limited to the 100G device, and are also applicable to non-100G high-speed devices.

Finally, it should be noted that the above embodiments are only used to illustrate the technical solutions of the present disclosure, not to limit it; although the present disclosure has been described in detail with reference to the embodiments as mentioned above, it will be understood by those of ordinary skill in the art that modifications may be made to the technical solutions described in the embodiments as mentioned above, or equivalents thereof may be substituted for some of the technical features thereof; however, these modifications or replacements do not cause the essence of the corresponding technical solutions to deviate from the spirit and scope of the technical solutions of the embodiments of the present disclosure.

What is claimed is:

1. A dual-carrier integrated optical device, wherein the dual-carrier integrated optical device comprises:
   an encapsulation unit, and a ceramic substrate and two independent carrier assemblies both arranged in the encapsulation unit;
   every the carrier assembly respectively comprises a DWDM active chip, a first heat sink, and an independent control element;
   the DWDM active chip is arranged on the first heat sink, and the first heat sink is arranged on the independent control element;
   the DWDM active chip and the independent control element are respectively connected to the ceramic substrate;
   the independent control element is used to adjust temperature of the DWDM active chip to adjust an output wavelength of the DWDM active chip,
   wherein said every carrier assembly further comprises a wavelength locker connected with the ceramic substrate;
   a portion of laser output by the DWDM active chip is output to an optical fiber, and a remaining portion enters the wavelength locker; the wavelength locker divides received laser signals into two paths of optical signals, one of which directly enters a first detector as reference light, and the other of which directly enters a wavelength filter and then a second detector as signal light;
   through the first detector and the second detector, a ratio of the two paths of optical signals is obtained, then a direction and a size of a wavelength drift of the DWDM active chip are obtained through the ratio of the two paths of optical signals, and then feeds back the direction and the size of the wavelength drift to the independent control element; the independent control element adjusts the temperature of the DWDM active chip according to the direction and size of the wavelength drift, so that a wavelength of the laser output by the DWDM active chip approaches a preset wavelength, thereby realizing a wavelength adjustment; and
   the light directly entering the first detector is used as a backlight monitoring current to monitor a working status of the DWDM active chip in real time.

2. The dual-carrier integrated optical device of claim 1, wherein said every carrier assembly further comprises a temperature sensing element;
   the temperature sensing element is connected with the ceramic substrate and is used for setting working temperature of the DWDM active chip.

3. The dual-carrier integrated optical device of claim 1, wherein said carrier assembly further comprises a temperature sensing element;
   the temperature sensing element is connected with the ceramic substrate and is used for setting working temperature of the DWDM active chip.

4. The dual-carrier integrated optical device of claim 1, wherein the output wavelengths of the two independent carrier assemblies are a combination of any two wavelengths from a 96-channel combiner or a 48-channel combiner.

5. The dual-carrier integrated optical device of claim 1, wherein the first heat sink is also arranged with a collimating lens for collimating laser output by the DWDM active chip.

6. The dual-carrier integrated optical device of claim 1, wherein the encapsulation unit is arranged with two optical windows, every one of which is respectively corresponding to a carrier assembly, and is used for transmitting laser output by the carrier assembly;
   a sleeve is respectively arranged at each optical window, and a contact pin is connected with the sleeve and is used for outputting the laser to an optical fiber.

7. The dual-carrier integrated optical device of claim 1, wherein the encapsulation unit is further arranged with a second heat sink and a combining element arranged on the second heat sink;
   the combining element is used for outputting laser which is output by the independent carrier assemblies and then combined.

8. The dual-carrier integrated optical device of claim 7, wherein an optical window is arranged on the encapsulation unit for transmitting the laser after being combined by the combining element;
   a sleeve is arranged at the one optical window, and a contact pin is connected with the sleeve and is used for outputting the laser to an optical fiber.

9. A photoelectric module, wherein the photoelectric module comprises the dual-carrier integrated optical device according to claim 1.

10. The dual-carrier integrated optical device of claim 1, wherein the first heat sink is also arranged with a collimating lens for collimating laser output by the DWDM active chip.

11. The dual-carrier integrated optical device of claim 2, wherein the first heat sink is also arranged with a collimating lens for collimating laser output by the DWDM active chip.

12. The dual-carrier integrated optical device of claim 3, wherein the first heat sink is also arranged with a collimating lens for collimating laser output by the DWDM active chip.

13. The dual-carrier integrated optical device of claim 4, wherein the first heat sink is also arranged with a collimating lens for collimating laser output by the DWDM active chip.

14. The dual-carrier integrated optical device of claim 1, wherein the encapsulation unit is arranged with two optical windows, every one of which is respectively corresponding to a carrier assembly, and is used for transmitting laser output by the carrier assembly;
   a sleeve is respectively arranged at each optical window, and a contact pin is connected with the sleeve and is used for outputting the laser to an optical fiber.

15. The dual-carrier integrated optical device of claim 2, wherein the encapsulation unit is arranged with two optical windows, every one of which is respectively corresponding to a carrier assembly, and is used for transmitting laser output by the carrier assembly;
   a sleeve is respectively arranged at each optical window, and a contact pin is connected with the sleeve and is used for outputting the laser to an optical fiber.

16. The dual-carrier integrated optical device of claim 1, wherein the encapsulation unit is further arranged with a second heat sink and a combining element arranged on the second heat sink;
   the combining element is used for outputting laser which is output by the independent carrier assemblies and then combined.

17. The dual-carrier integrated optical device of claim 2, wherein the encapsulation unit is further arranged with a second heat sink and a combining element arranged on the second heat sink;
   the combining element is used for outputting laser which is output by the independent carrier assemblies and then combined.

18. The dual-carrier integrated optical device of claim 3, wherein the encapsulation unit is further arranged with a second heat sink and a combining element arranged on the second heat sink;
   the combining element is used for outputting laser which is output by the independent carrier assemblies and then combined.

19. The dual-carrier integrated optical device of claim 4, wherein the encapsulation unit is further arranged with a second heat sink and a combining element arranged on the second heat sink;
   the combining element is used for outputting laser which is output by the independent carrier assemblies and then combined.

* * * * *